(12) United States Patent
Mentuis et al.

(10) Patent No.: US 9,163,427 B2
(45) Date of Patent: Oct. 20, 2015

(54) COLLAPSIBLE MISTING TENT FOR COOLING ANIMALS

(71) Applicants: Chad Roy Mentuis, Jersey Village, TX (US); Krissa Anne Mentuis, Jersey Village, TX (US)

(72) Inventors: Chad Roy Mentuis, Jersey Village, TX (US); Krissa Anne Mentuis, Jersey Village, TX (US)

(73) Assignees: Chad Mentuis, Houston, TX (US); Krissa Mentuis, Houston, TX (US)

( * ) Notice: Subject to any disclaimer, the term of this patent is extended or adjusted under 35 U.S.C. 154(b) by 0 days.

(21) Appl. No.: 14/146,691

(22) Filed: Jan. 2, 2014

(65) Prior Publication Data

US 2014/0190539 A1 Jul. 10, 2014

Related U.S. Application Data

(60) Provisional application No. 61/749,060, filed on Jan. 4, 2013.

(51) Int. Cl.
*E04H 15/02* (2006.01)
*E04H 15/50* (2006.01)
*A01K 1/00* (2006.01)

(52) U.S. Cl.
CPC .............. *E04H 15/50* (2013.01); *A01K 1/0082* (2013.01); *E04H 15/02* (2013.01)

(58) Field of Classification Search
CPC ......... E04H 15/48; E04H 15/02; E04H 15/14; E04H 15/50; B05B 15/061; B05B 15/08; B05B 3/044; A01K 1/0082
USPC .......... 135/98, 91, 93–94, 96, 135, 145, 147, 135/161, 120.1; 239/269, 279, 280; 119/651, 665; 472/128
See application file for complete search history.

(56) References Cited

U.S. PATENT DOCUMENTS

| | | | | |
|---|---|---|---|---|
| 5,638,853 | A * | 6/1997 | Tsai ............................... | 135/145 |
| 5,649,867 | A * | 7/1997 | Briggs .......................... | 472/128 |
| 5,913,477 | A * | 6/1999 | Dean ............................. | 239/289 |
| 6,029,610 | A * | 2/2000 | Ramsey et al. ................ | 119/651 |
| 6,050,872 | A * | 4/2000 | Cahill et al. .................... | 446/89 |
| 6,302,122 | B1 * | 10/2001 | Parker et al. .................. | 132/333 |
| 8,210,194 | B2 * | 7/2012 | Rehkemper .................... | 135/96 |
| 8,453,948 | B2 * | 6/2013 | Altaii ............................. | 239/281 |
| 2003/0074845 | A1 * | 4/2003 | Sample et al. .................... | 52/63 |
| 2004/0050411 | A1 * | 3/2004 | Lawrence ...................... | 135/128 |
| 2008/0006315 | A1 * | 1/2008 | Raniere ........................... | 135/91 |
| 2008/0011878 | A1 * | 1/2008 | Maples ......................... | 239/281 |
| 2009/0159109 | A1 * | 6/2009 | Zheng ............................ | 135/96 |

* cited by examiner

*Primary Examiner* — Winnie Yip

(74) *Attorney, Agent, or Firm* — Plager Schack LLP

(57) ABSTRACT

A collapsible misting tent is configured to cool an animal. The collapsible misting tent includes a structure sufficiently large to accommodate the animal, and having a first vertical support arm expendably attached to a cap. A second vertical support arm expendably attached to the cap and the first vertical support arm. A third vertical support arm expendably attached to the cap and the second vertical support arm. A fourth vertical support arm expendably attached to the cap, the first vertical support arm and the third vertical support arm. A water distribution system is attached to the structure has a hose attached to a tube mechanically further attached to the cap and configured to transport the water to the cap. A nozzle is attached to the cap and configured to dispense the water from the tube such that the animal enters the structure and is cooled by the water.

6 Claims, 3 Drawing Sheets

COLLAPSIBLE MISTING TENT FOR COOLING ANIMALS

RELATED APPLICATION

This application claims priority to provisional patent application U.S. Ser. No. 61/749,060 filed on Jan. 4, 2013, the entire contents of which is herein incorporated by reference.

BACKGROUND

The embodiments herein relate generally to structures that assist a user in cooling animals.

Prior to the disclosed invention animals had difficulty self-regulating body temperature in hot dry environments. This led to a large amount of work on the part of the animal owner to either cool the animal or to erect a permanent cooling station. Embodiments of the present invention solves this problem

SUMMARY

A collapsible misting tent is configured to cool an animal. The collapsible misting tent has a structure sufficiently large to accommodate the animal. The structure includes a first vertical support arm expendably attached to a cap. A second vertical support arm is expendably attached to the cap and the first vertical support arm. A third vertical support arm is expendably attached to the cap and the second vertical support arm. A fourth vertical support arm expendably is attached to the cap, the first vertical support arm and the third vertical support arm. A water distribution system is mechanically coupled to the structure. The water distribution system includes a hose, configured to transport water. A tube is mechanically coupled to the hose and the cap and configured to transport the water to the cap. A nozzle mechanically coupled to the cap and configured to dispense the water from the tube as either mist, fog or droplets. The animal enters the structure and is cooled by the water.

In some embodiments, the first vertical support arm is immediately adjacent to a first slide bracket. The second vertical support arm is immediately adjacent to a second slide bracket; the first slide bracket and the second slide bracket are further mechanically coupled to first-second side fold arm permitting the first vertical support arm to collapse to the second vertical support arm. The third vertical support arm is immediately adjacent to a third slide bracket. The second slide bracket and the third slide bracket are further mechanically coupled to third-second side fold arm permitting the third vertical support arm to collapse to the second vertical support arm. The fourth vertical support arm is immediately adjacent to a fourth slide bracket. The third slide bracket and the fourth slide bracket are further mechanically coupled to third-fourth side fold arm permitting the third vertical support arm to collapse to the fourth vertical support arm. The first slide bracket and the fourth slide bracket are further mechanically coupled to first-fourth side fold arm permitting the first vertical support arm to collapse to the fourth vertical support arm. The vertical support arms collapse toward one another permitting the collapsible misting tent to collapse.

In some embodiments, the first vertical support arm is expendably attached to the cap as follows: A first diagonal support arm mechanically coupled to the first slide bracket. A first corner stationary bracket mechanically coupled to the first vertical support arm. A first upper outer folding arm mechanically coupled to the first diagonal support arm and the first corner stationary bracket. A first upper inner fold arm mechanically coupled to the first upper outer folding arm with a first fold arm bracket. The first upper inner fold arm is mechanically coupled to the cap.

In some embodiments, the second vertical support arm is expendably attached to the cap as follows: a second diagonal support arm mechanically coupled to the second slide bracket. A second corner stationary bracket mechanically coupled to the second vertical support arm. A second upper outer folding arm mechanically coupled to the second diagonal support arm and the second corner stationary bracket. A second upper inner fold arm mechanically coupled to the second upper outer folding arm with a second fold arm bracket. The second upper inner fold arm is mechanically coupled to the cap.

In some embodiments, the third vertical support arm is expendably attached to the cap as follows: a third diagonal support arm mechanically coupled to the third slide bracket. A third corner stationary bracket mechanically coupled to the third vertical support arm. A third upper outer folding arm mechanically coupled to the third diagonal support arm and the third corner stationary bracket. A third upper inner fold arm mechanically coupled to the third upper outer folding arm with a third fold arm bracket. The third upper inner fold arm is mechanically coupled to the cap.

In some embodiments, the fourth vertical support arm is expendably attached to the cap as follows: a fourth diagonal support arm mechanically coupled to the fourth slide bracket. A fourth corner stationary bracket mechanically coupled to the fourth vertical support arm. A fourth upper outer folding arm mechanically coupled to the fourth diagonal support arm and the fourth corner stationary bracket. A fourth upper inner fold arm mechanically coupled to the fourth upper outer folding arm with a fourth fold arm bracket. The fourth upper inner fold arm is mechanically coupled to the cap.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
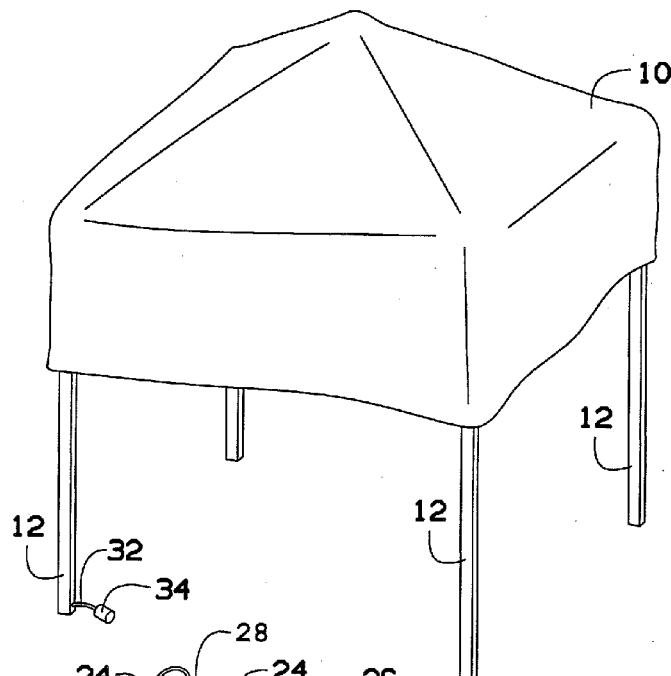
FIG. 1 is a perspective view of an embodiment of the invention shown in expanded configuration.
Figure 2:
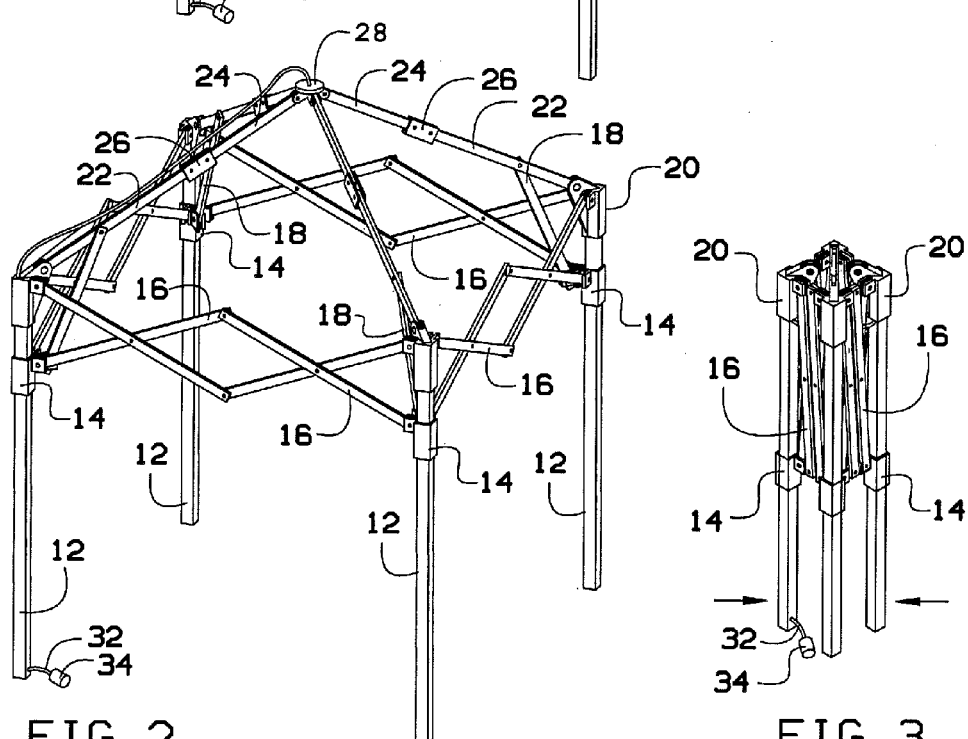
FIG. 2 is a perspective view of an embodiment of the invention shown in expanded configuration and omitting the cover for illustrative clarity.
Figure 3:
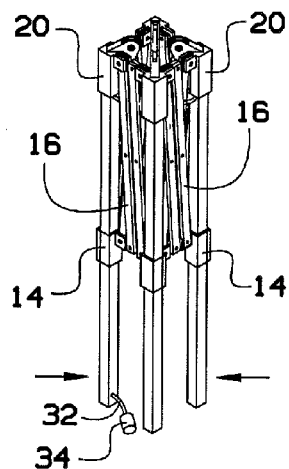
FIG. 3 is a perspective view of an embodiment of the invention shown in collapsed configuration and omitting the cover for illustrative clarity.
Figure 4:
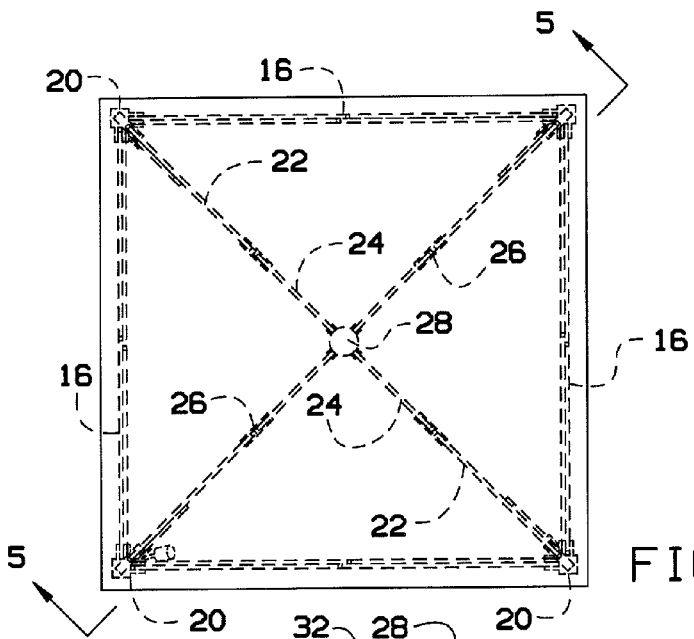
FIG. 4 is a top view of an embodiment of the invention.
Figure 5:
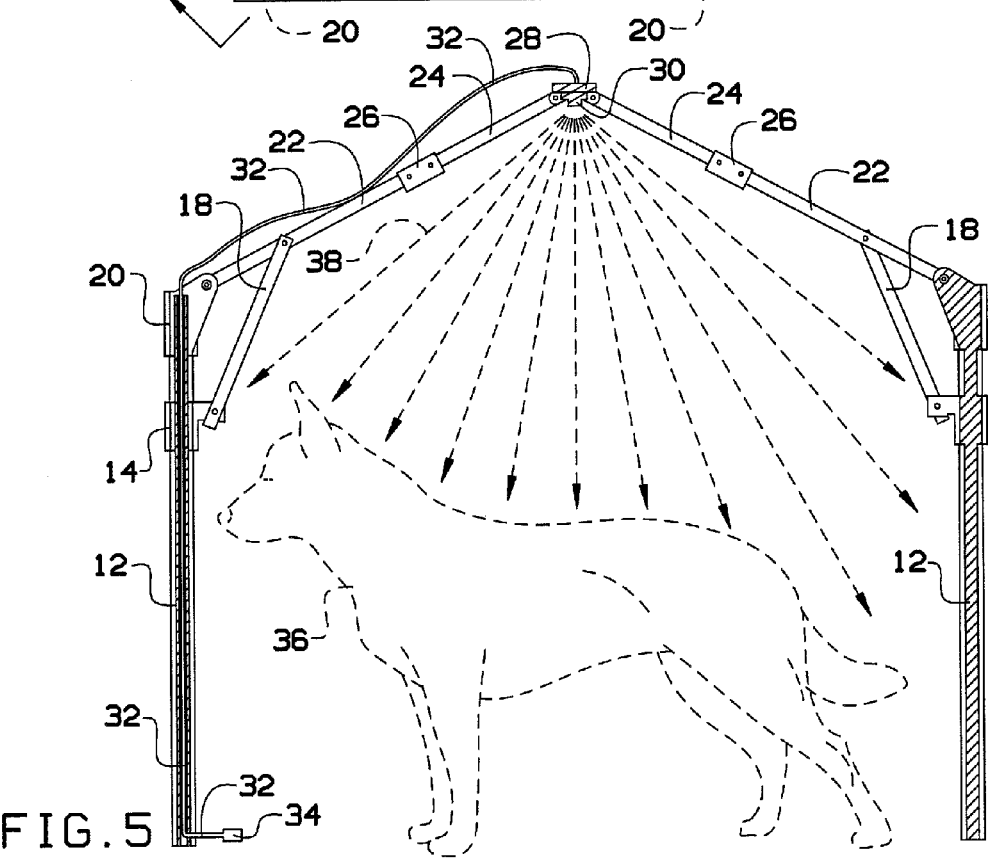
FIG. 5 is a section view of an embodiment of the invention along line 5-5 in FIG. 4 and omitting multiple components for illustrative clarity.
Figure 6:
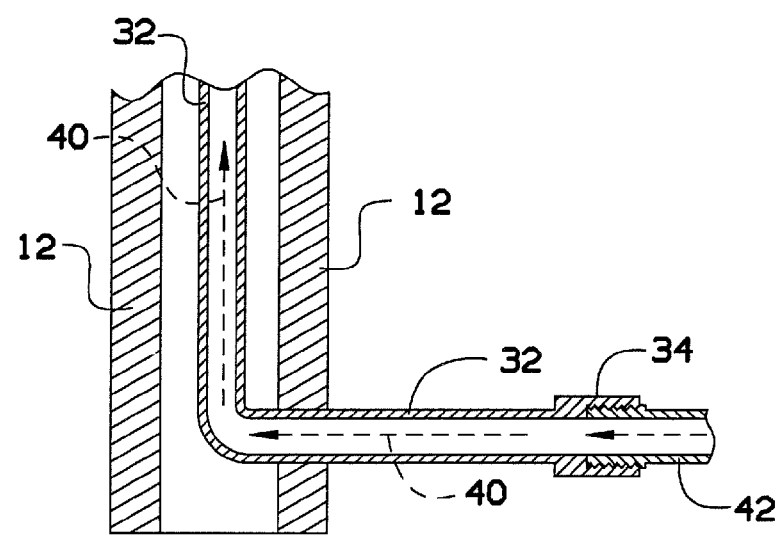
FIG. 6 is a section detail view of an embodiment of the invention shown in use with the hose.

By way of example, and referring to FIG. 1, Animal 36 enters the structure and is cooled by misting water as shown in FIG. 5 with a water distribution system detailed in FIG. 6. The structure comprises a plurality of arms mechanically coupled as shown in FIG. 2 and FIG. 4, which can collapse as shown in FIG. 3, which are covered by cover 10 as shown in FIG. 1.

First vertical support arm 12 is immediately adjacent to first slide bracket 14. First slide bracket 14 is further mechanically coupled to first-second side fold arm 16 and first-fourth side fold arm 16. First slide bracket 15 is further mechanically coupled to first diagonal support arm 18. First vertical support arm 12 is mechanically coupled to first corner stationary bracket 20. First diagonal support arm 18 and first corner stationary bracket 20 are mechanically coupled to first upper outer folding arm 22. First upper outer folding arm 22 is mechanically coupled to first upper inner fold arm 24 by first fold arm bracket 26. First upper inner fold arm 24 is mechanically coupled to cap 28.

Third vertical support arm 12 is immediately adjacent to third slide bracket 14. Third slide bracket 14 is further mechanically coupled to third-second side fold arm 16 and third-fourth side fold arm 16. Third slide bracket 15 is further mechanically coupled to third diagonal support arm 18. Third vertical support arm 12 is mechanically coupled to third corner stationary bracket 20. Third diagonal support arm 18 and third corner stationary bracket 20 are mechanically coupled to third upper outer folding arm 22. Third upper outer folding arm 22 is mechanically coupled to third upper inner fold arm 24 by third fold arm bracket 26. Third upper inner fold arm 24 is mechanically coupled to cap 28.

Fourth vertical support arm 12 is immediately adjacent to fourth slide bracket 14. Fourth slide bracket 14 is further mechanically coupled to first-fourth side fold arm 16 and third-fourth side fold arm 16. Fourth slide bracket 15 is further mechanically coupled to fourth diagonal support arm 18. Fourth vertical support arm 12 is mechanically coupled to fourth corner stationary bracket 20. Fourth diagonal support arm 18 and fourth corner stationary bracket 20 are mechanically coupled to fourth upper outer folding arm 22. Fourth upper outer folding arm 22 is mechanically coupled to fourth upper inner fold arm 24 by fourth fold arm bracket 26. Fourth upper inner fold arm 24 is mechanically coupled to cap 28.

Second vertical support arm 12 is immediately adjacent to second slide bracket 14. Second slide bracket 14 is further mechanically coupled to third-second side fold arm 16 and first-second side fold arm 16. Second slide bracket 15 is further mechanically coupled to second diagonal support arm 18. Second vertical support arm 12 is mechanically coupled to second corner stationary bracket 20. Second diagonal support arm 18 and second corner stationary bracket 20 are mechanically coupled to second upper outer folding arm 22. Second upper outer folding arm 22 is mechanically coupled to second upper inner fold arm 24 by second fold arm bracket 26. Second upper inner fold arm 24 is mechanically coupled to cap 28.

Of course, first, third, second and fourth are merely distinguishing names given to the four vertical support arms and their adjacent components. As a result, there are four vertical support arms 12, four slide brackets 14, four side fold arms 16, four diagonal support arms 18, four corner stationary brackets 20, four upper outer fold arms 22, four upper inner fold arms 24, and four fold arm brackets 26. These components are arranged in order to collapse upon each other as shown in FIG. 3 creating a collapsible structure.

The water distribution system operates in the following manner. Hose 42 is a regular garden hose that can be mechanically coupled to tube 32 through tube port 34. Tube 32 travels along first vertical support arm 12 and over first upper outer folding arm 22 and first upper inner fold arm 24 to cap 28 where tube 32 terminates at nozzle 30. Nozzle 30 is mechanically coupled to cap 28. Nozzle 30 can convert water 40 to mist 38 which can cool animal 36. As used in this application, fog particles have a diameter of less than 50 microns and, more typically, 10 microns. Fog particles are characterized as remaining suspended in air after dispensed until evaporated. As used in this application, mist particles have a diameter between 50 microns and 100 microns. Mist particles are characterized as falling slowly toward the ground and gathering on a surface such as animal 36 or the ground. As used in this application, droplets are characterized having a diameter greater than 100 microns that fall rapidly toward the ground while running off of surfaces as opposed to gathering on them. Experimentation has indicated that mist particles are most effective at cooling animal 36, when mist 38 is dispensed from nozzle 30, the temperature within the structure can be more than 20 degrees cooler than the ambient air outside the structure providing rapid cooling to animal 36.

The portable nature of the collapsible structure allows a user with limited space to use the collapsible structure only when needed. Further animal 36 can walk through mist 38 at its discretion allowing animal 36 to self-regulate body temperature.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A collapsible misting tent configured to cool an animal; the collapsible misting tent comprising:
    a structure configured to accommodate the animal, further comprising:
        a first vertical support arm expendably attached to a cap;
        a second vertical support arm expendably attached to the cap and the first vertical support arm;
        a third vertical support arm expendably attached to the cap and the second vertical support arm; and
        a fourth vertical support arm expendably attached to the cap, the first vertical support arm and the third vertical support arm;
    a water distribution system mechanically coupled to the structure and further comprising:
        a hose, configured to transport water;
        a tube, partially housed within the first vertical support extending above the first vertical support outside of the structure, mechanically coupled to the hose to a top of the cap and configured to transport the water to the cap; and
        a nozzle directly attached to a bottom of the cap and configured to dispense the water downwardly from the cap as either mist, fog or droplets;
    wherein the structure is adapted to permit the animal able to enters the structure and be cooled by the water.

2. The collapsible misting tent of claim 1, wherein the first vertical support arm is immediately adjacent to a first slide bracket;
    the second vertical support arm is immediately adjacent to a second slide bracket;
    the first slide bracket and the second slide bracket are further mechanically coupled to first-second side fold arm permitting the first vertical support arm to collapse to the second vertical support arm;
    the third vertical support arm is immediately adjacent to a third slide bracket; the second slide bracket and the third slide bracket are further mechanically coupled to third-second side fold arm permitting the third vertical support arm to collapse to the second vertical support arm;

the fourth vertical support arm is immediately adjacent to a fourth slide bracket;

the third slide bracket and the fourth slide bracket are further mechanically coupled to third-fourth side fold arm permitting the third vertical support arm to collapse to the fourth vertical support arm; the first slide bracket and the fourth slide bracket are further mechanically coupled to first-fourth side fold arm permitting the first vertical support arm to collapse to the fourth vertical support arm;

wherein the vertical support arms collapse toward one another permitting the collapsible misting tent to collapse.

3. The collapsible misting tent of claim 2, wherein the first vertical support arm is expendably attached to the cap as follows:
- a first diagonal support arm mechanically coupled to the first slide bracket;
- a first corner stationary bracket mechanically coupled to the first vertical support arm;
- a first upper outer folding arm mechanically coupled to the first diagonal support arm and the first corner stationary bracket;
- a first upper inner fold arm mechanically coupled to the first upper outer folding arm with a first fold arm bracket;
- wherein the first upper inner fold arm is mechanically coupled to the cap;

wherein the second vertical support arm is expendably attached to the cap as follows:
- a second diagonal support arm mechanically coupled to the second slide bracket;
- a second corner stationary bracket mechanically coupled to the second vertical support arm;
- a second upper outer folding arm mechanically coupled to the second diagonal support arm and the second corner stationary bracket;
- a second upper inner fold arm mechanically coupled to the second upper outer folding arm with a second fold arm bracket;
- wherein the second upper inner fold arm is mechanically coupled to the cap;

wherein the third vertical support arm is expendably attached to the cap as follows:
- a third diagonal support arm mechanically coupled to the third slide bracket;
- a third corner stationary bracket mechanically coupled to the third vertical support arm;
- a third upper outer folding arm mechanically coupled to the third diagonal support arm and the third corner stationary bracket;
- a third upper inner fold arm mechanically coupled to the third upper outer folding arm with a third fold arm bracket;
- wherein the third upper inner fold arm is mechanically coupled to the cap;

wherein the fourth vertical support arm is expendably attached to the cap as follows:
- a fourth diagonal support arm mechanically coupled to the fourth slide bracket;
- a fourth corner stationary bracket mechanically coupled to the fourth vertical support arm;
- a fourth upper outer folding arm mechanically coupled to the fourth diagonal support arm and the fourth corner stationary bracket;
- a fourth upper inner fold arm mechanically coupled to the fourth upper outer folding arm with a fourth fold arm bracket;
- wherein the fourth upper inner fold arm is mechanically coupled to the cap.

4. The collapsible misting tent of claim 1, wherein the water from the tube is dispensed as mist.

5. The collapsible misting tent of claim 1, wherein the water from the tube is dispensed as fog.

6. The collapsible misting tent of claim 1, wherein the water from the tube is dispensed as droplets.

\* \* \* \* \*